United States Patent [19]
Crownover

[11] 4,203,495
[45] May 20, 1980

[54] GLOVE AND TOOL DEVICE WITH TWO TOOL ELEMENTS

[76] Inventor: Frederick S. Crownover, Rte. 1, Box 27, Columbiana, Ala. 35051

[21] Appl. No.: 902,081

[22] Filed: May 2, 1978

Related U.S. Application Data

[63] Continuation-in-part of Ser. No. 760,553, Jan. 19, 1977, Pat. No. 4,089,379.

[51] Int. Cl.² ............................................. A01B 1/20
[52] U.S. Cl. ....................................... 172/370; 2/17; 172/375; 294/59; 294/131
[58] Field of Search ..................... 172/370, 375, 378; 2/17, 18, 160, 161 R, 161 A, ; 294/25, 26, 55, 57, 58, 59, 131; 3/12.8; 130/4, 10

[56] References Cited

U.S. PATENT DOCUMENTS

| 88,708 | 4/1869 | Hall | 130/4 |
|---|---|---|---|
| 151,295 | 5/1874 | Knight | 294/26 |
| 168,836 | 10/1875 | Hall | 130/4 |
| 1,465,510 | 8/1923 | Côté | 294/26 |
| 1,482,056 | 1/1924 | Watkins | 294/26 |
| 2,228,275 | 1/1941 | Lawrence | 294/57 |
| 2,436,507 | 2/1948 | Ellwood | 2/17 |
| 2,487,724 | 11/1949 | Pilson | 3/12.8 X |
| 2,606,050 | 8/1952 | Morris et al. | 172/375 X |
| 2,710,571 | 6/1955 | Pfister | 172/378 |
| 2,941,214 | 6/1960 | Michael | 2/161 R |
| 3,014,750 | 12/1961 | Briggs | 294/58 |
| 3,232,355 | 2/1966 | Woolworth | 172/378 |
| 3,802,302 | 4/1974 | Bengtson | 3/12.8 X |
| 3,855,633 | 12/1974 | Rhee | 2/161 A X |
| 4,089,379 | 5/1978 | Crownover | 172/370 |

FOREIGN PATENT DOCUMENTS 135284 11/1919 United Kingdom ................... 172/370

Primary Examiner—Richard T. Stouffer
Attorney, Agent, or Firm—Frederick L. Bergert

[57] ABSTRACT

A device having combined features of a glove and a garden tool is disclosed. The device includes a glove element having a bar grip installed therein, with a tool element attached to the bar grip. In one embodiment, a horizontal bar grip is employed in conjunction with a tool element having forks or tines, such as a rake. In a second embodiment, a vertical bar grip is employed in conjunction with a tool element which has the form of a scoop or spade. An additional feature includes the attachment of a bracket on the upper, forward portion of the glove element to receive a second tool element which is detachably connected thereto. Alternatively, a bracket for receiving a second tool element may be affixed directly to the shaft of the main fixed tool element. Also, a threaded connection may be employed for attachment of the tool element which is connected directly to the bar grip. The bar grip may be provided with grooves or ridges to allow the bar to be gripped more firmly.

7 Claims, 7 Drawing Figures

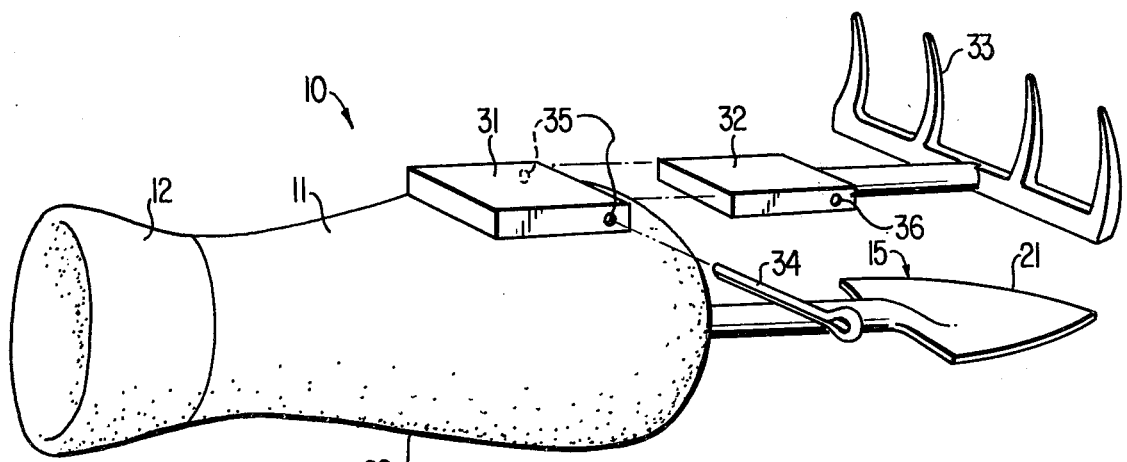
FIG. 3
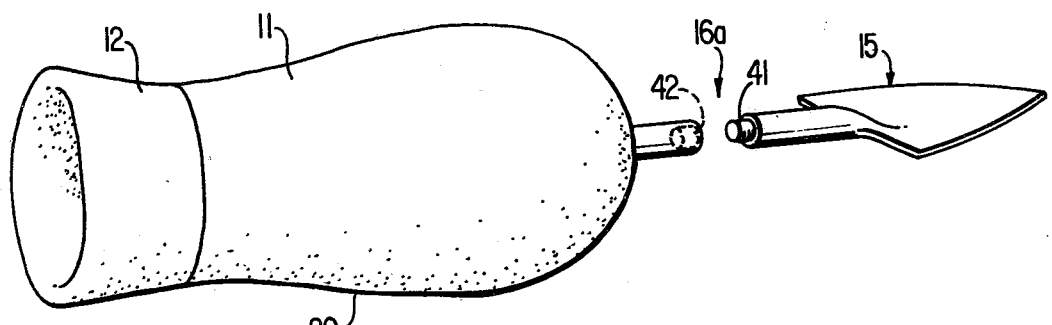
FIG. 4
FIG. 5
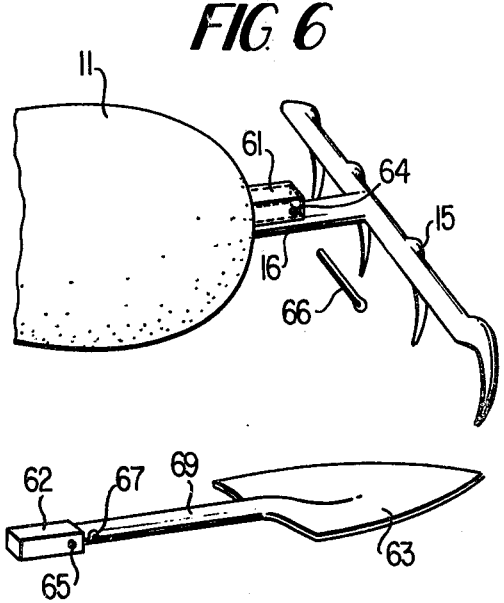
FIG. 6
FIG. 7

GLOVE AND TOOL DEVICE WITH TWO TOOL ELEMENTS

This is a continuation-in-part of application Ser. No. 760,553 filed Jan. 19, 1977, now U.S. Pat No. 4,089,379.

BACKGROUND AND SUMMARY OF THE INVENTION

The present invention is related to a device having the combined features of a glove and a garden tool. More particularly, the present invention is related to a garden tool which includes the general shape or form of a glove, and with grip means located on the interior of the glove, in order to provide for ease of use and control of garden tools or implements, while protecting the hand and forearm from scratches, dirt and the like.

Various garden tools are known in the art, including tools for digging, raking, weeding and the like, employing configurations which include forks, tines, scoops or spade-type configurations in order to carry out various gardening chores. While gloves may often be worn in the use of such tools, the use of ordinary garden gloves does not altogether prevent the scratching and soiling of the hands of the gardener. In addition, some of the garden gloves presently on the market are rather cumbersome and thus do not allow a firm grip to be maintained while using garden tools, with the result that the tool may slip from the hand of the gardener during use, possibly causing damage or injury to the plants being cultivated as well as to the gardener himself.

One prior art device for use as a gardener's glove is that described in U.S. Pat. No. 3,593,803, in which there is described a glove construction having flexible tool elements associated with the finger members. Another device of this type is described in U.S. Pat. No. 2,954,832, in which the glove construction is provided with tool elements which are detachable from the glove so that the glove may be used to protect the user's hand without the use of the tool elements.

By the present invention, there is provided an improved device having the combined features of a glove and garden tool, which device is constructed so as to overcome the disadvantages previously mentioned. The device of the present invention includes a glove element, having a sleeve attached on one end thereof and a tool element on the opposite end, and with a bar grip positioned on the interior of the glove. In one embodiment, the tool element is provided with forks or tines for use as a rake, for example, and the bar grip is positioned horizontally across the interior width of the glove. In another embodiment, the tool element is in the form of a scoop or spade-type element, and the bar grip is positioned vertically within the interior of the glove. The use of such a bar grip construction has been found to result in improved control of the tool element, while providing all the advantages of the use of gloves for protecting the hands and forearm.

An additional feature of the present invention includes the attachment of a bracket on the upper, forward portion of the glove element to receive a second tool element which is detachably connected thereto. Alternatively, a bracket for receiving a second tool element may be affixed directly to the shaft of the main fixed tool element. As another embodiment, a threaded connection may be employed for attachment of the main tool element which is connected directly to the bar grip. In an alternative embodiment, the bar grip is provided with grooves and ridges to allow the bar to be gripped more firmly.

BRIEF DESCRIPTION OF THE DRAWINGS

The advantages and features of the glove and garden tool device of the present invention will be more fully understood from the following description of the preferred embodiments, taken in conjunction with the accompanying drawings wherein:

FIG. 3 is a perspective view of a third embodiment of the present invention;

FIG. 4 is a perspective view of an alternative embodiment of the handle portion of the present invention;

FIG. 5 is a perspective view of an alternative embodiment of the bar grip of the present invention;

FIG. 6 is a partial perspective view of a fourth embodiment of the present invention; and FIG. 7 is a perspective view of a second tool element employed in the embodiment of FIG. 6.

DESCRIPTION OF THE PREFERRED EMBODIMENTS

Figure 1:
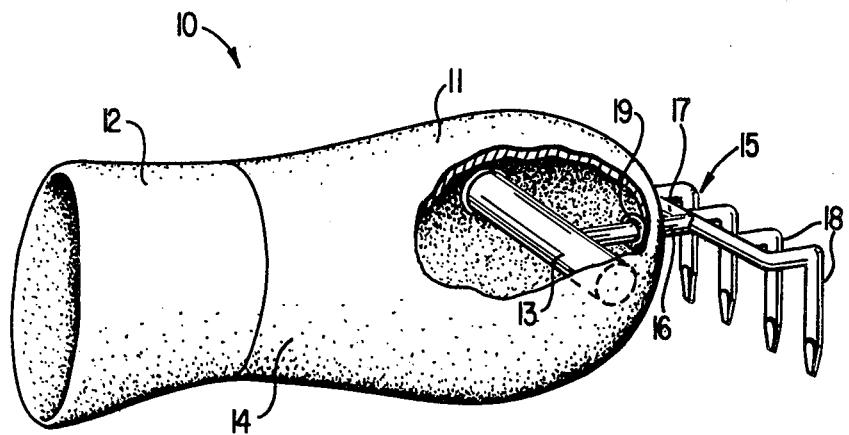
FIG. 1 is a perspective view of a first embodiment of the glove and garden tool device of the present invention, showing the tool element formed integrally with the glove.

In the embodiment of the present invention as illustrated in FIG. 1, there is shown a glove and garden tool device 10, including a glove element 11, formed of a relatively thin, flexible tough material such as metal or plastic, and having a sleeve member 12 of canvas or other similar durable, relatively rigid material attached thereto by adhesive sealing or other conventional means.

On the interior of the glove element 11, there is positioned a horizontal bar grip 13, in the shape of a rod or bar, which is of a durable material such as metal or plastic and which may be of a size such as about 1 inch in diameter, for example. This bar grip 13 is attached at each end by adhesive sealing or other conventional means to the interior sides of the glove element 11 at a height about halfway up the sides 14 of the glove element 11. In this way, there is provided a convenient grip 13 which may be grasped by insertion of the hand through the opening at the end of the sleeve 12. The fingers and thumb are extended around the grip 13 so as to encompass the grip 13 which then rests in the palm of the hand across the width thereof.

Attached to the bar grip 13 is a tool element 15 having a handle portion 16, a head portion 17 and tines 18 extending outwardly and downwardly from the head 17, so as to form a rake configuration at the working end of the glove element 11. The tool element 15 is made of a durable material such as tool steel, for example, and may be formed integrally with the bar grip 13, or otherwise attached by conventional means. The handle portion 16 extends outwardly from the grip 13 through a small opening 19 in the outer end of glove element 11. Thus the glove element 11 is otherwise closed at its outer end to protect against scratching and soiling of the hands.

Figure 2:
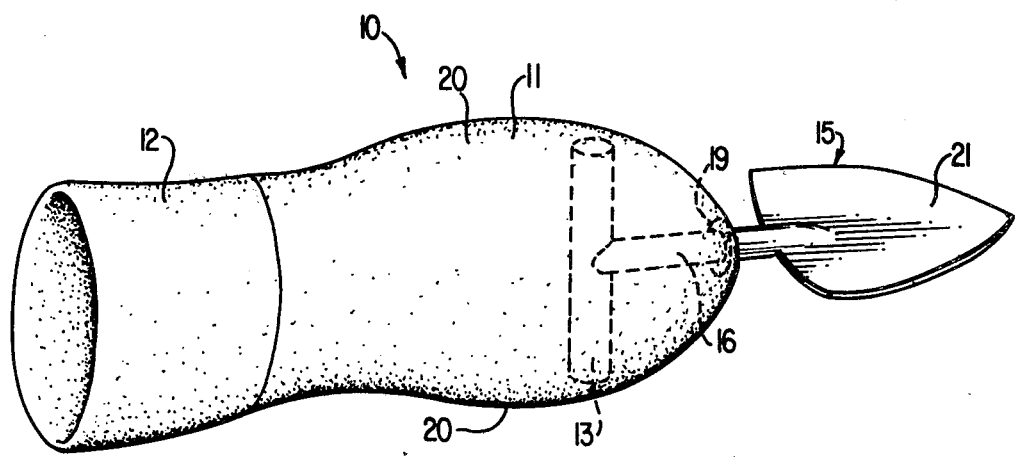
FIG. 2 is a perspective view of a second embodiment of the glove and garden tool device of the present invention.

In the embodiment as shown in FIG. 2, the basic structure is similar to that of FIG. 1. However, in this embodiment, the tool element 15 is of the scoop or spade-type, having a handle portion 16 and spade portion 21. Also, the bar grip 13 is located vertically in this embodiment and attached to the upper and lower interior portions 20 of the glove element 11. In this manner, a grip is provided for the gardener as he uses the glove and garden tool device 10 for work requiring a scoop or spade.

In the use of the glove and garden tool device as shown in either FIG. 1 or FIG. 2, the gardener inserts his hand through the opening in the sleeve 12 and grasps the horizontal or vertical grip 13. It has been found that the use of a horizontal grip in the case of the fork or tine configuration tool element is advantageous in providing a firm grip for ease of control of a fork or tine-type tool such as a rake. In addition, the horizontal grip facilitates the particular hand and arm movements required in the operation of such a tool. In the case of the scoop or spade-type tool element, on the other hand, the vertical grip has been found to be advantageous in allowing a firm grip to be maintained in order to control the scoop or spade-type tool, as well as in facilitating the particular hand and arm movements required in the operation of a scoop or spade-type tool.

In the embodiment of the present invention as shown in FIG. 3, a hollow bracket 31 is mounted on the upper, forward portion of the exterior of the glove element 11. The bracket 31 is of metal or heavy plastic material and attached to the glove element by adhesive sealing or other conventional means. The bracket 31 is positioned so as to receive a base member 32 which carries a second tool member 33 attached thereto. The base member 32 and tool member 33 may be of one-piece construction and formed of a durable material such as tool steel, for example. The bracket 31 and the base member 32 received thereby may be of a square or rectangular cross-section, for example, or any other shape which will allow firm attachment of the bracket 31 to the glove element 11, while also providing a connection of sufficient strength to support the tool element 33 while in use.

The base member 32 is slidably received in the bracket 31, preferably so as to provide a snug fit, and the base member 32 is detachably connected to the bracket 31 by suitable means such as a connecting pin 34 which extends through holes 35 on either side of the bracket 31 and through a hole 36 drilled through the width of the base member 32. In the use of tools such as the spade 15 and rake 33 as shown, the base member 32 is preferably inserted into the bracket 31 with the tool element 33 positioned so that, by inverting or turning over the glove device 10, the tool element 33 will be in the operative position. Suitable tool elements 33 which may be employed include a fork or rake, as shown in FIG. 3 as well as any of various other tool configurations such as, for example, a spade.

Thus the embodiment of FIG. 3 provides a pair of tool elements 15, 33, either of which is available simply by turning the glove element 11 from the upright to the inverted position or vice versa. The position of the hand upon the bar grip 13 will, of course, require a change as the glove 11 is inverted. While the embodiment of FIG. 3 is shown with the tool element 15 in the form of a spade, it will be understood that any of various tool elements previously described may be employed as element 15 and further, that the bar grip 13 employed in this embodiment may be in either the horizontal or vertical position, depending upon the particular tool element 15 employed. Also, in some applications, it may be desirable to position the tools 15,33 for operative use without inverting the glove 11.

In FIG. 4, there is shown an alternative embodiment for the handle portion employed in the present invention. In this embodiment, a threaded connection is provided for the handle portion 16a, with the connecting end portion 41 being threadedly received within connecting end portion 42, thus allowing for quick removal of one tool element 15 and installation of another tool element 15. Any other suitable means for quick detachment which will allow a quick change of the tool element 15 may be similarly employed. This embodiment of the handle portion may be employed with either of the embodiments of FIG. 1, 2, or 3.

In the embodiment of FIG. 5, there is shown an alternative configuration for the bar grip employed in the present invention. In this embodiment, the bar grip 13a is provided with a plurality of alternating ridges 51 and grooves 52 on the side thereof toward the handle portion 16 to allow for ease of gripping by the fingers of the user. The connection of the bar grip 13a to the handle portion 16 and to the inner walls of the glove element remain essentially the same as described in connection with the embodiments of FIGS. 1 and 2. This embodiment of the bar grip may be employed with any of the embodiments of the present invention.

In FIGS. 6 and 7, there is shown an embodiment of the present invention in which a tubular bracket 61, which may be of square or rectangular cross-section, for example, is affixed directly to the upper surface of the handle portion 16. The bracket 61 may be of metal construction and attached to the handle 16 by welding, for example.

The bracket 61 receives the base member 62 of a second tool element 63, in a manner similar to the connection of base member 32 with bracket 31, as holes 64 on either side of the bracket 61 mate with a corresponding hole 65 in the base 62, and a connecting pin 66 is employed to secure the member 62 in the bracket 61. A raised rib 67 on either side of the forward end of the base member 62 acts to limit the extension of the handle 69 into the bracket 61.

As in the case of the embodiment of FIG. 3, the bar grip 13 employed in the embodiment of FIGS. 6 and 7 may be in either the horizontal or vertical position depending upon the particular tool element 15 employed. The second tool element 63 may be a spade as shown, or other tool such as a grill fork, for example. The length of the bracket 61 should be sufficient to allow the tool element 63 to be secured in a firm and rigid condition. Generally a bracket 61 length of from about 1 to 3 inches will be satisfactory. In this embodiment, the second tool element 63 may be positioned for use with the glove element 11 in either the same position as for use of tool 15 or with the glove 11 in the inverted position, depending upon the particular tool elements 15,63 being employed.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely the preferred embodiments thereof.

It is claimed:
1. In a glove and tool device which includes a longitudinally extending glove element having upper and lower portions connected by side portions and an opening at one end thereof for insertion of the hand of a user of the device, and wherein a first tool element is attached to said glove element and extends outwardly from the exterior of said glove element, a bar grip being positioned on the interior of said glove element with its ends fixedly attached to opposite interior portions of said glove element, and including a first longitudinally extending handle member having one end thereof attached to the bar grip and the other end attached to said first tool element, the improvement comprising means attached to said glove element for receiving a second tool element, and a second tool element connected by a second longitudinally extending handle to said receiving means and extending outwardly from the exterior of said glove element, said receiving means being positioned on the upper portion of said glove element on the exterior surface thereof, said first and second tool elements being generally aligned one over the other and said first and second handles of said tool elements extending substantially parallel to the longitudinal axis of said glove element and to each other, so that one of said tool elements is in the operative position when the device is in an upright position and the other tool element is in the operative position when the device is in an inverted position.

2. The device of claim 1 wherein said receiving means includes means for detachably securing said second tool element.

3. The device of claim 1 wherein said first tool element is attached at the end of said glove element which is opposite to that in which the opening is located.

4. The device of claim 1, wherein said first tool element is detachably connected to said glove element.

5. The device of claim 1, wherein said bar grip is provided with a plurality of alternating ridges and grooves along the length thereof to allow for ease of gripping by the fingers of the user.

6. In a glove and tool device which includes a longitudinally extending glove element having upper and lower portions connected by side portions and an opening at one end thereof for insertion of the hand of a user of the device, and wherein a first tool element is attached to said glove element through a first longitudinally extending handle member which extends outwardly from the exterior of said glove element, a bar grip being positioned on the interior of said glove element with its ends fixedly attached to opposite interior portions of said glove element, said first handle member having its inner end secured to said bar grip, the improvement comprising means attached to said first handle member for receiving a second tool element, and a second tool element connected by a second longitudinally extending handle to said receiving means and extending outwardly from the exterior of said glove element, said receiving means being positioned on the upper surface of said first handle, said first and second tool elements being generally aligned one over the other and said first and second handles of said tool elements extending substantially parallel to the longitudinal axis of said glove element and to each other, so that one of said tool elements is in the operative position when the device is in an upright position and the other tool element is in the operative position when the device is in an inverted position.

7. The device of claim 6 wherein said receiving means includes means for detachably securing said second tool element.

* * * * *